UNITED STATES PATENT OFFICE.

CARLETON ELLIS, OF MONTCLAIR, NEW JERSEY, AND MORTIMER J. COHEN, OF NEW YORK, N. Y., ASSIGNORS, BY MESNE ASSIGNMENTS, TO SETH B. HUNT, TRUSTEE, OF MOUNT KISCO, NEW YORK.

ESTER BODIES FROM UNSATURATED HYDROCARBONS.

1,365,051.  Specification of Letters Patent.  Patented Jan. 11, 1921.

No Drawing.  Application filed April 25, 1918. Serial No. 230,683.

*To all whom it may concern:*

Be it known that we, CARLETON ELLIS and MORTIMER J. COHEN, citizens of the United States, and residents of Montclair, county of Essex, and State of New Jersey, and New York, county of New York, and State of New York, respectively, have invented certain new and useful Improvements in Ester Bodies from Unsaturated Hydrocarbons, of which the following is a specification.

This invention relates to ester bodies derived from unsaturated hydrocarbons.

We have described in our application Serial No. 176,669, filed June 25, 1917, to which reference is hereby made, one method by which ester bodies, such as acetates and the like, may be produced from material containing unsaturated hydrocarbons, such as cracked gasolene, shale oil and the like, by extracting with a preferably acid extracting or concentrating agent, such as sulfuric acid, to form reactive acid liquor substantially immiscible in residual hydrocarbon material from which esters, as acetates, may be prepared by treatment with organic acid or material yielding organic acid on reaction with sulfuric acid, such as a salt of acetic acid, as calcium acetate or the like, and the example given below will serve to give an understanding of one way in which ester bodies, as acetates, may be derived from unsaturated hydrocarbons by treating such acid extract or liquor directly without the intermediate production therefrom, or at least the isolation, of alcoholic material, which can be obtained by hydrolysis of the acid liquor. The production of ester bodies, as acetates, direct from such acid liquor is the preferred manner of producing the ester bodies, since when so produced they can be made in a much simpler and more efficient and economical manner than when, for example, the acid liquor is hydrolyzed to alcohols and the alcoholic material thereafter esterified, which mode of producing the ester bodies may be resorted to, however, if desired. The following example is for illustration only and not for limitation of the invention.

Acid liquor containing 224 parts by weight of 1.8 sulfuric acid, and 100 parts by weight of unsaturated hydrocarbons was extracted by the sulfuric acid from olefin containing material consisting of the liquid obtained by compressing and condensing vapors from petroleum stills. In extracting unsaturated hydrocarbons from this liquid, the acid was entered into the oil slowly and with agitation and cooling, which were continued for a time after the acid had been added, and after standing for a further time the acid extract was withdrawn from beneath the saturated material, the acid having gained 100 parts by weight during the extractive action. To this acid extract or liquor, which was of substantially 1.25 specific gravity, was added 54.5 parts by weight of water, and to the acid liquor so diluted 246 parts by weight of gray commercial calcium acetate were gradually added with a consequent rise in temperature, a still equipped with an agitator being made use of, which was operated while the mixing was going on. This mixture was digested by letting it stand for a period of about twelve hours and it was then distilled, being agitated with a rotary stirring during distillation, yielding a distillate comprising a layer of oily material and a layer of weak acetic acid. During the distillation water was added to the still at substantially the rate that the still contents distilled over. The distillate consisted approximately of 165 parts of the oily material and about an equal weight of weak acetic acid. Sodium carbonate was then added to the distillate until it was neutral. The oil was separated from the solution of sodium acetate formed and the oil was equal to about 134 parts by weight, having a saponification number of 326 and a gravity of .845 and consisting of about 75%, or about 100.5 parts, of mixed mono-acetates calculated as amyl acetate. Other esters, as formates, etc., may be produced in a similar manner.

While the acid liquor, which is substantially immiscible in residual hydrocarbon material, is preferably separated therefrom as in the foregoing example, when solvents containing gasolene, for example, are desired, such separation need not be made, but the gasolene may be retained to appear in the solvent product which may comprise saturated gasolene, for example, and mixtures of esters corresponding to unsaturated hydrocarbons of cracked gasolene. The hydrocarbon material may be suitably prepared, chosen or fractionated and treated in the foregoing or other ways, so as to yield ester bodies boiling within a given range, or to produce solvent mixtures containing, for example, substantially given proportions of acetates and of saturated gasolene and the like.

Another process for producing ester bodies of the present invention from unsaturated hydrocarbons is described and claimed in our co-pending application Serial No. 106,769, filed June 30, 1916, and a process for producing such ester bodies by acetylation of alcohols derived from unsaturated hydrocarbons is described and claimed in our co-pending application, Serial No. 106,770, filed June 30, 1916, to which application reference is hereby made.

The following example given for illustration only and not for limitation, affords an understanding of one way in which ester bodies may be made by acetylation of alcohols corresponding to unsaturated hydrocarbons of cracked petroleum.

A portion of a mixture of alcohols derived from cracking Mexican petroleum and sulfating the cracked product and thereafter hydrolyzing it, such mixture having a boiling point 125-140° C., was treated with an equal weight of glacial acetic acid and with 1% of sulfuric acid as a catalyzer. This was boiled under a reflux condenser for a period of 4½ hours, at the end of which time examination showed acetation of the alcohol to be practically at an end. The mixture was dissolved in water, neutralized, and saponification number was found to be 372, which corresponds to 95½% ester content referred to hexyl acetate.

There may be more or less variation from close or accurate correspondence of the ester bodies to the unsaturated hydrocarbons from which derived, by reason, for example, of parts of the unsaturated hydrocarbon material not being extracted by the sulfuric acid or other extracting agent, and because more or less linking up or splitting off of carbon atoms and the like may occur, and perhaps there may be more or less variation from such close correspondence in yet other respects, but there is nevertheless a substantial correspondence.

The ester bodies of the present invention, such as acetates, for example, may be prepared substantially free from sulfonated acid-forming compounds and may be refined in any desired manner and fractionated or otherwise separated into component parts. The boiling points of such ester bodies are usually considerably higher than the boiling points of the unsaturated hydrocarbon material from which they are produced, but are usually somewhat lower than is the case with esters made from fusel oil, and the boiling points, &c. usually indicate that considerable quantities of the secondary, and perhaps in some cases tertiary, esters, as acetates and so forth, are present, and this is advantageous where low boiling point solvents are preferable and comparatively rapid evaporation is desired. When produced from liquid hydrocarbon material containing unsaturated hydrocarbons, such as cracked gasolene, for example, in the manner described, the composite acetate material usually boils principally between about 100° C. and about 200° C., though there may be considerable variation in this respect, as, for example, mixtures of acetates may be obtained boiling mainly between 100° and 175°, and with unsaturated hydrocarbon material boiling somewhat higher, mixtures of acetates boiling mainly between 125° and 200° C. may be obtained, and acetates may be obtained to some extent boiling below 100° or over 200° C.

The acetates are excellent solvents for pyroxylin and similar material, the solvent action apparently being the more effective because of coördinate solvent effect due to the complex mixtures of solvents present. The mixtures of acetates, for example, may be used in such form or they may be obtained separately, as by repeated fractionation, or they may be used with other solvents or diluents and in various other ways and in a large number of industries, or they may be made use of as starting material for the production of various other bodies or products.

The ester bodies, as acetates, of the present invention may be produced in large quantities and at low cost from a substantially unlimited supply of readily available material, namely, unsaturated hydrocarbons of gasolene, etc., heretofore looked upon as the objectionable, or at least the less desirable, portion thereof for the normal uses to which gasolene is put, rendering unnecessary the prevalent use of numerous unsatisfactory adulterants and substitutes for acetates made from fusel oil, which is available only in limited quantities and at high prices.

In referring to unsaturated hydrocarbons from which ester bodies are derived as olefins, the term is used to embrace analogous unsaturated hydrocarbons reacting in similar manner. Liquid hydrocarbon materials containing olefins, as, for example, cracked gasolene, shale oil and the like, are referred to in our claims as olefin oils.

The various matters and things herein referred to and not covered by the claims of this patent are claimed in our co-pending cases as follows:

| Serial number. | Date of filing. | Title. |
| --- | --- | --- |
| 230,679 | Apr. 25, 1918 | Process of making alcohols, &c. |
| 176,669 | June 25, 1917 | Direct production of ester bodies from unsaturated hydrocarbons. |
| 106,769 | June 30, 1916 | Process of directly esterifying olefins and products thereof. |
| 106,770 | June 30, 1916 | Esterification of olefins and bodies derived from olefins. |

We claim:

1. As a composition of matter, a liquid consisting mainly of a mixture of unsubstituted mono-esters of monohydric alcohols corresponding to the olefins of cracked petroleum.

2. As a composition of matter, a liquid consisting mainly of a mixture of unsubstituted mono-acetic esters of monohydric alcohols corresponding to the olefins of cracked petroleum.

3. As a composition of matter, a liquid consisting mainly of a mixture of unsubstituted mono-acetic esters of monohydric alcohols corresponding to the olefins of cracked gasolene, and boiling mainly between 100° and 200° C.

4. A mixture of unsubstituted mono-esters derived from mixtures of unsaturated hydrocarbons and corresponding mainly to secondary monohydric alcohols.

In testimony that we claim the foregoing we have hereto set our hands, this 23rd day of April, 1918.

CARLETON ELLIS.
MORTIMER J. COHEN.